(12) United States Patent
Wang et al.

(10) Patent No.: US 7,347,576 B2
(45) Date of Patent: Mar. 25, 2008

(54) ULTRAVIOLET LIGHT INSTRUMENT CLUSTER

(75) Inventors: Taochuan Bruce Wang, Novi, MI (US); Vyacheslav B. Birman, Auburn Hills, MI (US); Richard Sanders, Clarkston, MI (US); Werner Eckardt, Rochester, MI (US); Christopher J. Volpe, Waterford, MI (US)

(73) Assignee: Continential Automotive Systems US, Inc., Auburn Hills ( * ) Notice: Subject to any disclaimer, the term of this patent is extended or adjusted under 35 U.S.C. 154(b) by 65 days.

(21) Appl. No.: 11/409,798

(22) Filed: Apr. 24, 2006

(65) Prior Publication Data

US 2006/0256545 A1  Nov. 16, 2006

Related U.S. Application Data

(60) Provisional application No. 60/681,226, filed on May 13, 2005.

(51) Int. Cl.
*G01D 11/28* (2006.01)

(52) U.S. Cl. .............................. 362/23; 362/27; 362/28; 362/29; 362/487

(58) Field of Classification Search ................. 362/23, 362/27–30, 487–489, 471, 482, 230
See application file for complete search history.

(56) References Cited

U.S. PATENT DOCUMENTS

| 4,661,796 | A | * | 4/1987 | Hirano ....................... 340/438 |
| 5,130,548 | A | | 7/1992 | Sano et al. |
| 5,997,161 | A | | 12/1999 | Stringfellow et al. |
| 6,224,222 | B1 | | 5/2001 | Inoguchi et al. |
| 6,404,463 | B1 | | 6/2002 | Knoll et al. |
| 6,499,852 | B1 | * | 12/2002 | Kino et al. .................... 362/23 |
| 6,729,738 | B2 | * | 5/2004 | Fuwausa et al. .............. 362/84 |

FOREIGN PATENT DOCUMENTS

EP   1462297 A2   9/2004

OTHER PUBLICATIONS

International Search Report and Written Opinion dated Sep. 26, 2006.

* cited by examiner

*Primary Examiner*—Sandra O'Shea
*Assistant Examiner*—Mark Tsidulko

(57) ABSTRACT

An instrument cluster assembly includes a first instrument cluster graphic and a second instrument cluster graphic. The second instrument cluster graphic is superimposed on the first instrument cluster graphic.

9 Claims, 2 Drawing Sheets

ULTRAVIOLET LIGHT INSTRUMENT CLUSTER

This application claims priority to U.S. Provisional Application No. 60/681,226, which was filed on May 13, 2005.

BACKGROUND

This invention relates to lighting and, more particularly, to vehicle instrument cluster lighting.

Instrument clusters are widely known and used in vehicles to provide an occupant with vehicle information, such as vehicle speed, engine RPM, fuel level, and a variety of other information. Typically, one or more light sources illuminate the instrument cluster to provide improved viewing. Conventionally, the light sources are mounted on a printed circuit board to backlight instrument cluster graphics. The light may also be piped to illuminate remote graphics, pointers, or other instrument cluster features.

Another known instrument cluster uses black light sources to illuminate some of the graphics and pointers, which include a phosphoric ink. The black light sources are mounted on the sides of the instrument cluster to cast black light over the instrument cluster. The graphics are arranged in different planes such that, when illuminated, they provide an aesthetically pleasing holographic three-dimensional effect.

There is a trend in vehicle design toward increased use of innovative lighting effects. For example, new vehicle models or updates of existing models often incorporate novel lighting effects that are pleasing to the occupants and distinguish over other models. Accordingly, there is a need for new instrument cluster lighting effects.

SUMMARY

One example instrument cluster assembly includes a first graphic and a second graphic that is superimposed on the first graphic. For example, the first graphic illuminates in the presence of non-ultraviolet light and the second graphic illuminates in the presence of ultraviolet light.

One example method of illuminating an instrument cluster includes illuminating a first graphic or a second graphic that is superimposed on the first graphic with ultraviolet light.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION

Figure 1:
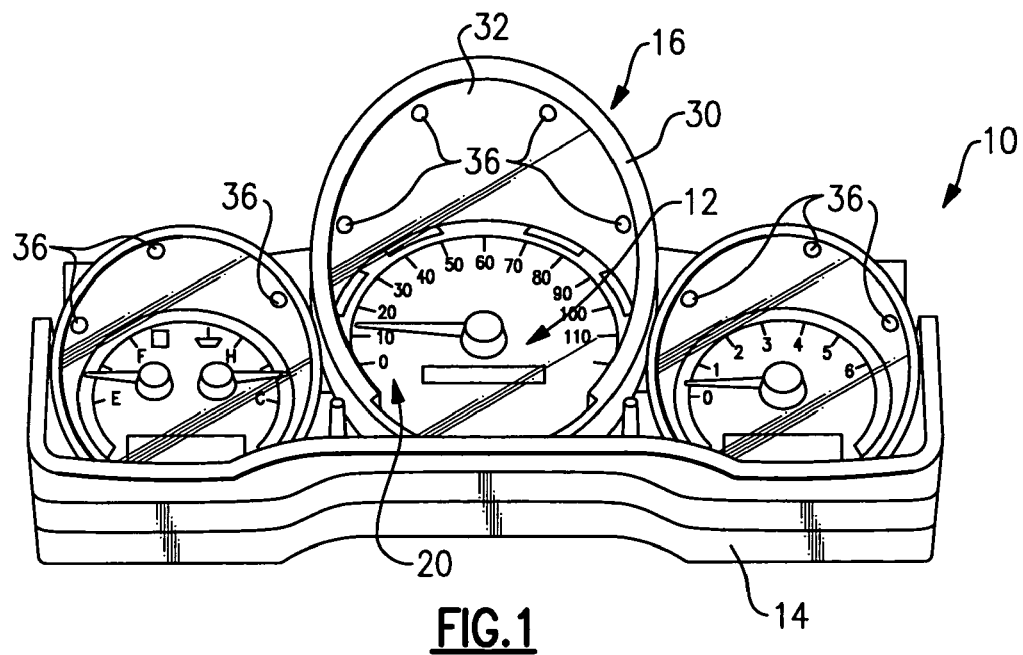
FIG. 1 shows an example instrument cluster.
Figure 2:
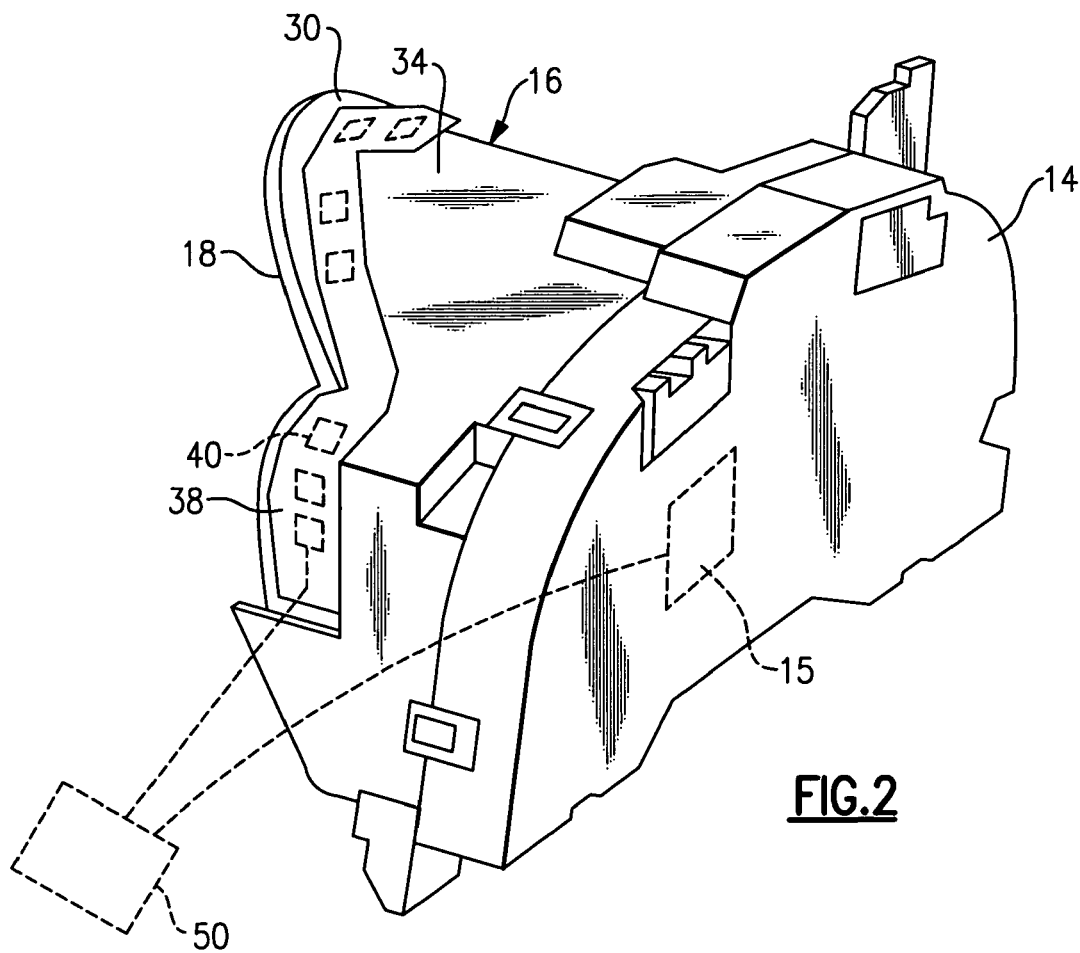
FIG. 2 shows a perspective view of the rear of the instrument cluster shown in FIG. 1.

FIGS. 1 and 2 illustrate selected portions of an example instrument cluster 10 that provides a vehicle occupant with vehicle information. In this example, the instrument cluster 10 includes a dial 12 that is supported by a light housing 14. The light housing 14 contains, for example, a printed circuit board (not shown) and one or more light sources 15 (shown schematically), such as a LED, for illuminating (e.g., backlighting) a portion of the vehicle graphics 20 on the dial 12 in a known manner. In the disclosed example, the dial 12 is positioned between the light housing 14 and a mask 16 that attaches to the light housing 14 in a known manner. A lens 18 is mounted to the front of the mask 16 to protect the dial 12 from dust or other debris.

As can be appreciated from FIG. 2, the mask 16 includes cylindrical portions 30 having an inner surface 32 and an outer surface 34. A plurality of openings 36 extend between the inner surface 32 and the outer surface 34.

In this example, a flexible circuit board 38 is mounted on the mask 16 over the plurality of openings 36. The flexible circuit board 38 in one example is heat staked directly to the mask 16. In another example, the flexible circuit board 38 is clipped directly to the mask 16. A plurality of ultraviolet light sources 40 are operably connected to the flexible circuit board 38 such that the ultraviolet light sources 40 cast ultraviolet light through the plurality of openings 36 onto the dials 12.

Figure 3:
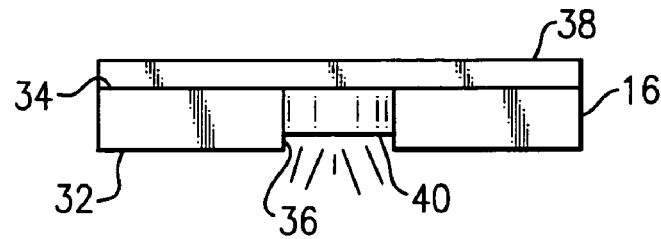
FIG. 3 shows a cross-section of an ultraviolet light source mounted on a mask of an instrument cluster.

Referring to FIG. 3, the ultraviolet light source 40 extends into the opening 36 of the mask 16. In this example, the ultraviolet light source 40 does not extend entirely through the opening 36. However, in other examples, the ultraviolet light source 40 may extend entirely through the opening 36 beyond the inner surface 32. Alternatively, the flexible circuit board 38 is mounted to the mask 16 such that the ultraviolet light source 40 does not extend at all into the opening 36.

Figure 4:
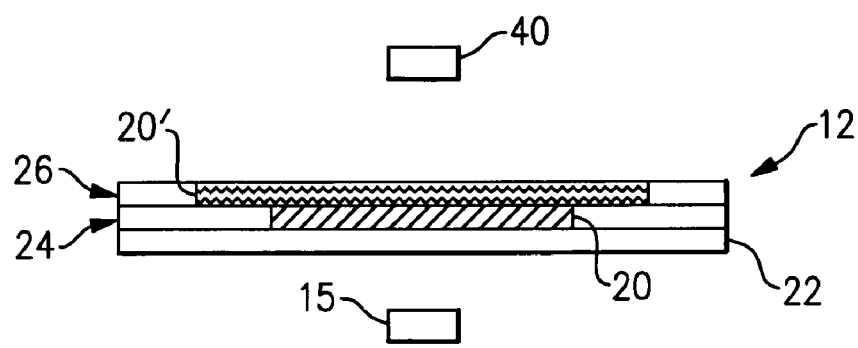
FIG. 4 shows a cross-section of an example instrument cluster dial having superimposed graphics.

FIG. 4 illustrates a cross-sectional view of a portion of the dial 12. In this example, the dial 12 includes a substrate 22, such as a transparent sheet. A first layer 24 is disposed on the substrate and includes one of the graphics 20. A second layer 26 is disposed on the first layer 24 and includes another graphic 20'. In the disclosed example, the graphic 20' is partially superimposed on the graphic 20 (i.e., the graphic 20' overlaps the graphic 20). In other examples, there may be additional layers having additional graphics on, between, or below the illustrated layers 24 and 26. The graphics 20 and 20' may include any of a variety of different types of graphics including, for example, telltales, letters, numerals, background patterns, logos, or the like.

In the disclosed example, the first and second layers 24 and 26 are printed onto the substrate 22 in a known manner. The graphic 20 is printed with an ink that illuminates in the presence of non-ultraviolet light, and the graphic 20' is printed with a phosphoric ink that illuminates in the presence of ultraviolet light. Thus, when the non-ultraviolet light source 15 is on and the ultraviolet light source 40 is off, the graphic 20 is in an illuminated state and the graphic 20' is in a non-illuminated state. That is, the graphic 20 is visible to an observer but the graphic 20' is not visible (or is only vaguely visible). Inversely, when the non-ultraviolet light source 15 is off and the ultraviolet light source 40 is on, the graphic 20 is in a non-illuminated state and the graphic 20' is in an illuminated state. That is, the graphic 20 is not visible to the observer (or is only vaguely visible) but the graphic 20' is visible.

Alternatively, the graphic 20 is printed with a phosphoric ink and the graphic 20' is printed with an ink that illuminates in the presence of non-ultraviolet light. However, one possible drawback of this example is that the ink of the graphic 20' may absorb some of the ultraviolet light before it reaches the phosphoric ink of the graphic 20, thereby decreasing the illumination of the graphic 20.

In another example, the non-ultraviolet light source 15 and ultraviolet light source 40 interface in a known manner with a vehicle component 50 (shown in phantom in FIG. 2) to switch between the illuminated and non-illuminated states in response to a state of the vehicle component 50. The vehicle component 50 is shown schematically as a single component, however, the vehicle component 50 can include multiple components, as described below.

Figure 5:
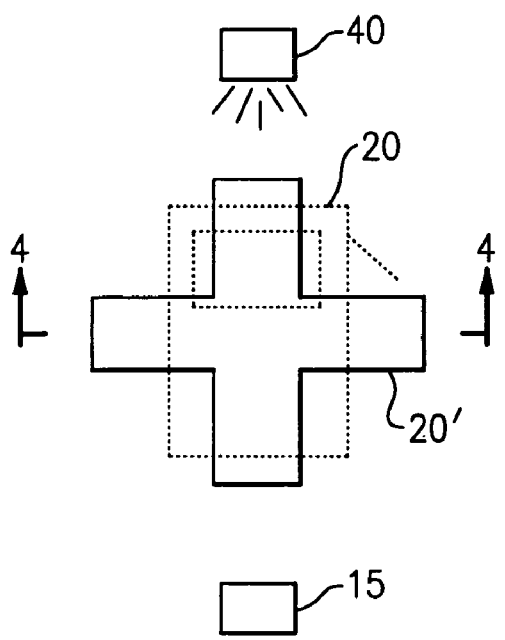
FIG. 5 illustrates example superimposed graphics wherein a first graphic is illuminated and a second graphic is not illuminated.

In one example shown in FIG. 5, the vehicle component 50 is in a first state. In response, the ultraviolet light source 40 is on or is turned on and illuminates the graphic 20'. The non-ultraviolet light source 15 is off or is turned off. Thus, in the first state of the vehicle component 50, the graphic 20' is visible and the graphic 20 is not visible (or is only vaguely visible).

Figure 6:
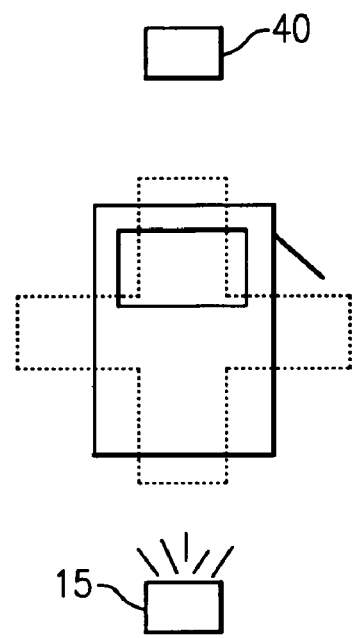
FIG. 6 illustrates the superimposed graphics of FIG. 5 wherein the first graphic is not illuminated and the second graphic is illuminated.

Referring to FIG. 6, the vehicle component 50 is in a second state. In response, the ultraviolet light source 40 is off or is turned off. The non-ultraviolet light source 15 is on or is turned on. Thus, in the second state of the vehicle component 50, the graphic 20' is not visible (or is only vaguely visible) and the graphic 20 is visible.

In another example, the vehicle component 50 is a vehicle door. In this example, the first state corresponds to opening the door and the second state corresponds to closing the door. That is, the ultraviolet light sources 40 are turned on in response to opening the door and shut off in response to closing the door.

In another example, the vehicle component 50 includes the vehicle door and a vehicle engine. In this example, the first state corresponds to opening the door and the second state corresponds to starting the vehicle engine. That is, the ultraviolet light sources 40 are turned on in response to opening the door and shut off in response to starting the vehicle engine.

In another example, the vehicle component 50 includes the vehicle door, the vehicle engine, and a key to start the engine. In this example, the first state corresponds to opening the door and the second state corresponds to turning the key to start the engine. That is, the ultraviolet light sources 40 turn on in response to opening the door and shut off in response to turning the key to start the engine.

As can be appreciated, the disclosed instrument cluster 10 provides innovative lighting features that appear and disappear from view, depending on the interactions of the vehicle occupant with the vehicle. This provides the benefit of aesthetically pleasing lighting effects when the vehicle occupant enters the vehicle. Furthermore, if the graphic 20' is a company logo, the disclosed examples provide an innovative design for presenting the company brand to the vehicle occupant.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. An instrument cluster assembly comprising:

a first instrument cluster graphic;

a first, ultraviolet light source mounted on a flexible printed circuit board, the first light source for selectively emitting ultraviolet light;

a second instrument cluster graphic at least partially superimposed on the first instrument cluster graphic, the first instrument cluster graphic and the second instrument cluster graphic being printed on an instrument cluster dial, wherein one of the first instrument cluster graphic or the second instrument cluster graphic is illuminable in response to the ultraviolet light and the other of the first instrument cluster graphic or the second instrument cluster graphic is illuminable in response to non-ultraviolet light; and a mask adjacent the instrument cluster dial, the mask having a cylindrical portion having an inner surface and an outer surface, and the flexible printed circuit board is secured directly to the outer surface of the mask.

2. The assembly as recited in claim 1, wherein each of the first instrument cluster graphic and the second instrument cluster graphic comprises an illuminated state and a non-illuminated state, and wherein the first instrument cluster graphic is in the illuminated state when the second instrument cluster graphic is in the non-illuminated state and the second instrument cluster graphic is in the illuminated state when the first instrument cluster graphic is in the non-illuminated state.

3. The assembly as recited in claim 1, comprising a second light source that selectively emits non-ultraviolet light.

4. The assembly as recited in claim 1, wherein the one of the first instrument cluster graphic or the second instrument cluster graphic that illuminates in response to the ultraviolet light comprises a layer having phosphoric ink.

5. The assembly as recited in claim 1, wherein the one of the first instrument cluster graphic or the second instrument cluster graphic that illuminates in response to the ultraviolet light comprises a company logo.

6. The assembly as recited in claim 1, wherein the one of the first instrument cluster graphic or the second instrument cluster graphic that illuminates in response to the ultraviolet light comprises a dial background pattern.

7. The assembly as recited in claim 1, wherein the first light source emits the ultraviolet light in response to opening a vehicle door.

8. The assembly as recited in claim 7, wherein the first light source ceases emitting the ultraviolet light in response to at least one of closing the vehicle door, starting a vehicle engine, or turning a key to start a vehicle engine.

9. The assembly as recited in claim 1, wherein the cylindrical portion includes at least one opening that extends between the inner and outer surfaces, wherein the opening is associated with the first light source for transmitting the ultraviolet light from the first light source to the instrument cluster dial.

* * * * *